United States Patent
Pang (10) Patent No.: US 10,206,434 B2
(45) Date of Patent: Feb. 19, 2019

(54) APPARATUS AND A METHOD FOR EXTRACTING A COMPOUND FROM A SUBSTANCE

(71) Applicant: Champ View Development Limited, Kowloon (HK)

(72) Inventor: Dominic Yat Ting Pang, Kowloon (HK)

(73) Assignee: CHAMP VIEW DEVELOPMENT LIMITED, Kowloon (HK)

( * ) Notice: Subject to any disclaimer, the term of this patent is extended or adjusted under 35 U.S.C. 154(b) by 0 days.

(21) Appl. No.: 15/527,409

(22) PCT Filed: Mar. 23, 2016

(86) PCT No.: PCT/CN2016/077117
§ 371 (c)(1),
(2) Date: May 17, 2017

(87) PCT Pub. No.: WO2016/155549
PCT Pub. Date: Oct. 6, 2016

(65) Prior Publication Data
US 2017/0367408 A1    Dec. 28, 2017

(30) Foreign Application Priority Data
Mar. 27, 2015    (HK) .................................. 15103150.3

(51) Int. Cl.
*A24F 13/00*    (2006.01)
*A24F 47/00*    (2006.01)
*A24B 7/04*    (2006.01)
*A47J 42/00*    (2006.01)

(52) U.S. Cl.
CPC .............. *A24F 47/008* (2013.01); *A24B 7/04* (2013.01); *A24F 47/004* (2013.01); *A47J 42/00* (2013.01)

(58) Field of Classification Search
CPC ......... A24F 47/008; A24F 47/002; A24B 7/04
USPC .................................................. 131/329, 328
See application file for complete search history.

(56) References Cited

U.S. PATENT DOCUMENTS

| | | | |
|---|---|---|---|
| 9,802,011 B2* | 10/2017 | Davidson | A61M 11/042 |
| 2012/0325227 A1* | 12/2012 | Robinson | A61M 15/06 |
| | | | 131/328 |
| 2013/0192615 A1* | 8/2013 | Tucker | H01C 17/00 |
| | | | 131/328 |
| 2016/0331913 A1* | 11/2016 | Bourque | A61M 11/02 |
| 2017/0095624 A1* | 4/2017 | Davidson | A61K 9/007 |
| 2017/0119979 A1* | 5/2017 | Davidson | A61M 11/042 |
| 2018/0014576 A1* | 1/2018 | White | A24F 47/008 |

* cited by examiner

*Primary Examiner* — Hae Moon Hyeon
(74) *Attorney, Agent, or Firm* — Renner Kenner Greive Bobak Taylor & Weber (57) ABSTRACT

An apparatus for extracting a compound from a substance comprising an extraction chamber arranged to extract a compound from a substance stored within the extraction chamber, wherein the extraction chamber is arranged to agitate the substance; and when upon the substance is under an applied heat, the extraction chamber is arranged to extract the compound into an air flow passing through the extraction chamber.

27 Claims, 9 Drawing Sheets

APPARATUS AND A METHOD FOR
EXTRACTING A COMPOUND FROM A
SUBSTANCE

TECHNICAL FIELD

The present invention relates to an apparatus and a method for extracting a compound from a substance, and particularly, although not exclusively, to an apparatus for extracting a fragrant compound from tobacco.

BACKGROUND

Tobacco products may be consumed differently according to different tobacco products. For example, shredded tobacco may be consumed by burning it in a pipe to extract the fragrance contained in the tobacco. Tobacco may also be wrapped in a piece of paper with a filter to form a cigarette which does not require a pipe for consuming the tobacco properly.

Cigarettes may be one of the most popular tobacco products. The consumption of cigarettes requires burning the cigarette and thus burning the wrapped tobacco in order to extract the fragrance contained in the tobacco. Burning or combusting the tobacco generates a large amount of heat such that the air flow carrying the fragrance is heated to a temperature of up to 1000° C. In turn, this may cause a user who inhales the hot air flow to choke occasionally. In addition, burning tobacco generates a large amount of carbon monoxide, carbon dioxide, as well as other pollutant particles which create air pollution. These undesirable extracted matters are also hazardous to the user of the cigarette.

SUMMARY OF THE INVENTION

In accordance with a first aspect of the present invention, there is provided an apparatus for extracting a compound from a substance comprising: an extraction chamber arranged to extract a compound from a substance stored within the extraction chamber, wherein the extraction chamber is arranged to agitate the substance; and when upon the substance is under an applied heat, the extraction chamber is arranged to extract the compound into an air flow passing through the extraction chamber.

In an embodiment of the first aspect, the compound contains a first fragrance.

In an embodiment of the first aspect, the extraction chamber is further arranged to fluidly communicate with an air inlet and an air outlet.

In an embodiment of the first aspect, the air flow is supplied through the air inlet to the extraction chamber, and wherein the air flow is exhausted through the air outlet.

In an embodiment of the first aspect, the extraction chamber is arranged to grind the substance stored within the extraction chamber.

In an embodiment of the first aspect, the substance is grinded to form fragments of the substance.

In an embodiment of the first aspect, the extraction chamber further comprises a grinder arranged to grind the substance stored within the extraction chamber.

In an embodiment of the first aspect, the grinder comprises a grinding surface at an internal cavity of the extraction chamber.

In an embodiment of the first aspect, the extraction chamber is arranged to compress the substance stored within the extraction chamber.

In an embodiment of the first aspect, the extraction chamber is operable to rotate so as to agitate, to compress and/or to grind the substance stored within the extraction chamber.

In an embodiment of the first aspect, the extraction chamber is a source of applied heat.

In an embodiment of the first aspect, the air flow passing through the extraction chamber is a source of applied heat.

In an embodiment of the first aspect, the extraction chamber is arranged to heat the substance stored within the extraction chamber and/or the air flow passes through the extraction chamber.

In an embodiment of the first aspect, the substance and/or the air flow is arranged to be heated at 200° C. to 350° C. in the extraction chamber.

In an embodiment of the first aspect, the air flow is arranged to be preheated before entering the extraction chamber.

In an embodiment of the first aspect, the air flow is arranged to be preheated at 300° C. to 500° C.

In an embodiment of the first aspect, the substance is arranged to be heated at 180° C. to 200° C. in the extraction chamber.

In an embodiment of the first aspect, further comprising at least one valve deposited within an air passage arranged to allow the air flow to pass through, wherein the at least one valve is arranged to control the amount of air passing through the air passage.

In an embodiment of the first aspect, the at least one valve is substantially adjacent to the air inlet and/or the air outlet.

In an embodiment of the first aspect, a supplementary compound is arranged to be extracted from a supplementary component when the air flow passes through the supplementary component.

In an embodiment of the first aspect, the supplementary component is deposited adjacent to the air outlet.

In an embodiment of the first aspect, the supplementary component is a filter filled with the supplementary compound.

In an embodiment of the first aspect, the supplementary compound contains a second fragrance.

In an embodiment of the first aspect, the extraction chamber is arranged to operate according to a predetermined extraction profile associated with the substance stored in the extraction chamber.

In an embodiment of the first aspect, the predetermined extraction profile includes a heating duration and/or a heating temperature.

In an embodiment of the first aspect, the extraction chamber is arranged to be at least partially powered by an AC/DC power source.

In an embodiment of the first aspect, further comprising a communication module arranged to communicate with an electronic communication device.

In an embodiment of the first aspect, the electronic communication device is arranged to control the operation of the extraction chamber.

In an embodiment of the first aspect, the substance includes at least one of tobacco, hemp, a cigar, or a cigarette.

In accordance with a second aspect of the present invention, there is provided a method for extracting a compound from a substance comprising the steps of: agitating a substance stored within an extraction chamber; and when upon the substance is under an applied heat, extracting a compound from the substance into an air flow passing through the extraction chamber.

In an embodiment of the second aspect, the compound contains a first fragrance.

In an embodiment of the second aspect, further comprising the steps of: supplying the air flow through an air inlet to the extraction chamber; and exhausting the air flow through an air outlet.

In an embodiment of the second aspect, the step of agitating the substance stored within the extraction chamber further comprising the step of grinding the substance to form fragments of the substance.

In an embodiment of the second aspect, the step of agitating the substance stored within the extraction chamber further comprising the step of compressing the substance stored within the extraction chamber.

In an embodiment of the second aspect, further comprising the step of heating the substance stored within the extraction chamber and/or the air flow passing through the extraction chamber.

In an embodiment of the second aspect, further comprising the step of preheating the air flow before the air flow enters the extraction chamber.

In an embodiment of the second aspect, further comprising the step of controlling at least one valve deposited within an air passage arranged to allow the air flow to pass through, so as to control the amount of the air flow passing through the air passage.

In an embodiment of the second aspect, further comprising the step of introducing a supplementary compound to the air flow.

In an embodiment of the second aspect, the supplementary compound contains a second fragrance.

In an embodiment of the second aspect, further comprising the step of operating the extraction chamber according to a predetermined extraction profile associated with the substance stored within the extraction chamber.

In an embodiment of the second aspect, further comprising the step of controlling the operation of the extraction chamber with an electronic communication device.

BRIEF DESCRIPTION OF THE DRAWINGS

Embodiments of the present invention will now be described, by way of example, with reference to the accompanying drawings in which.

DETAILED DESCRIPTION OF THE PREFERRED EMBODIMENT

Figure 1:
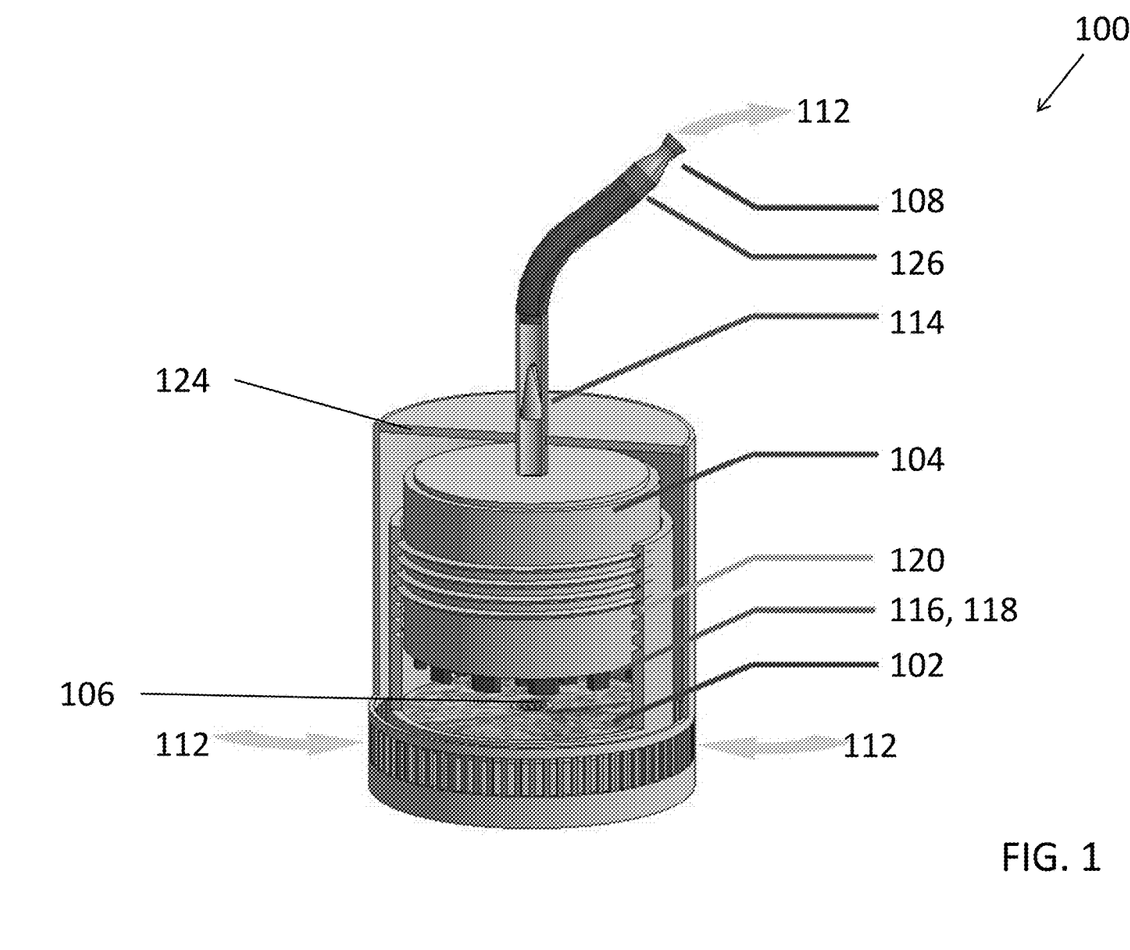
FIG. 1 is a perspective view of an apparatus for extracting a compound from a substance in accordance with one embodiment of the present invention.
Figure 2A:
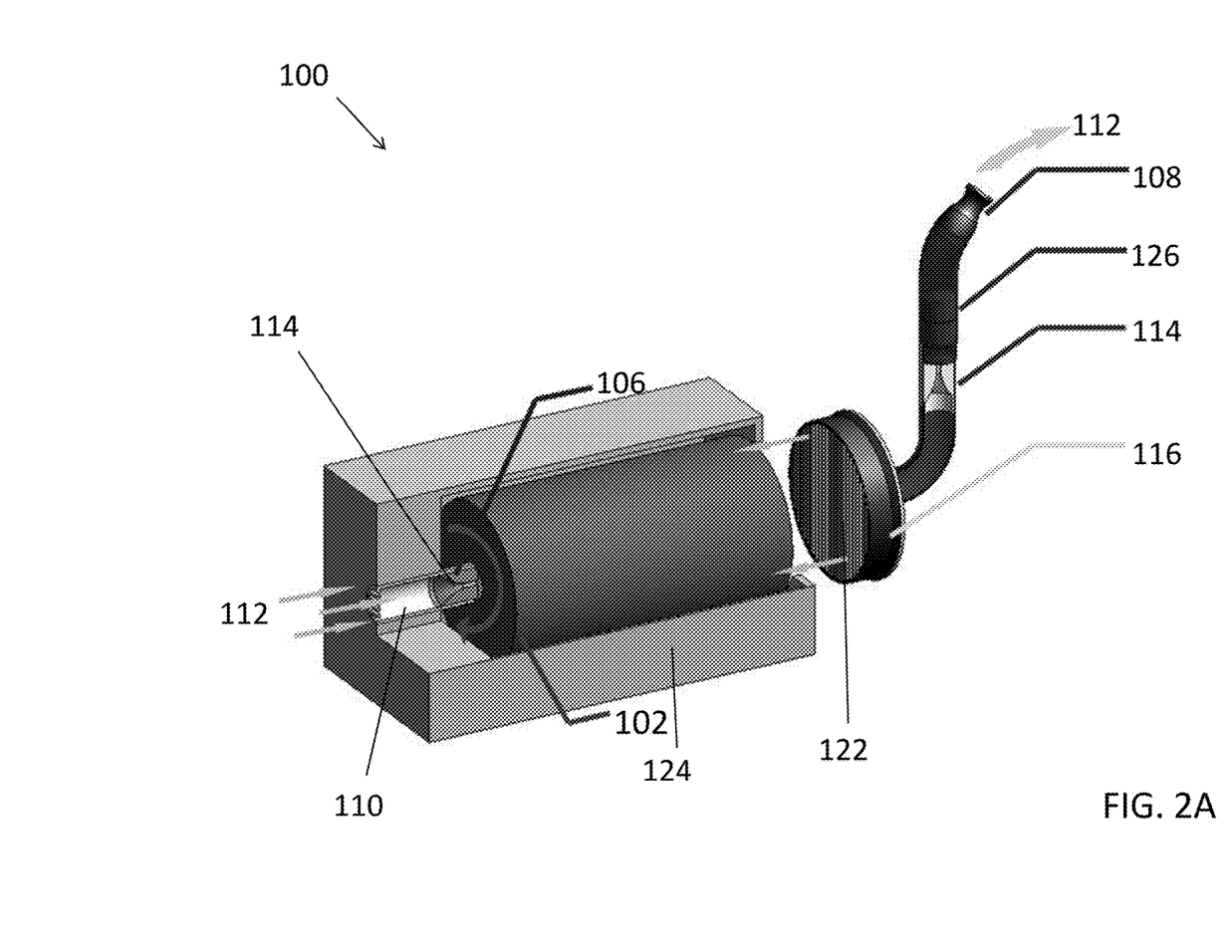
FIG. 2A is a perspective view of an apparatus for extracting a compound from a substance in accordance with another embodiment of the present invention.
Figure 2B:
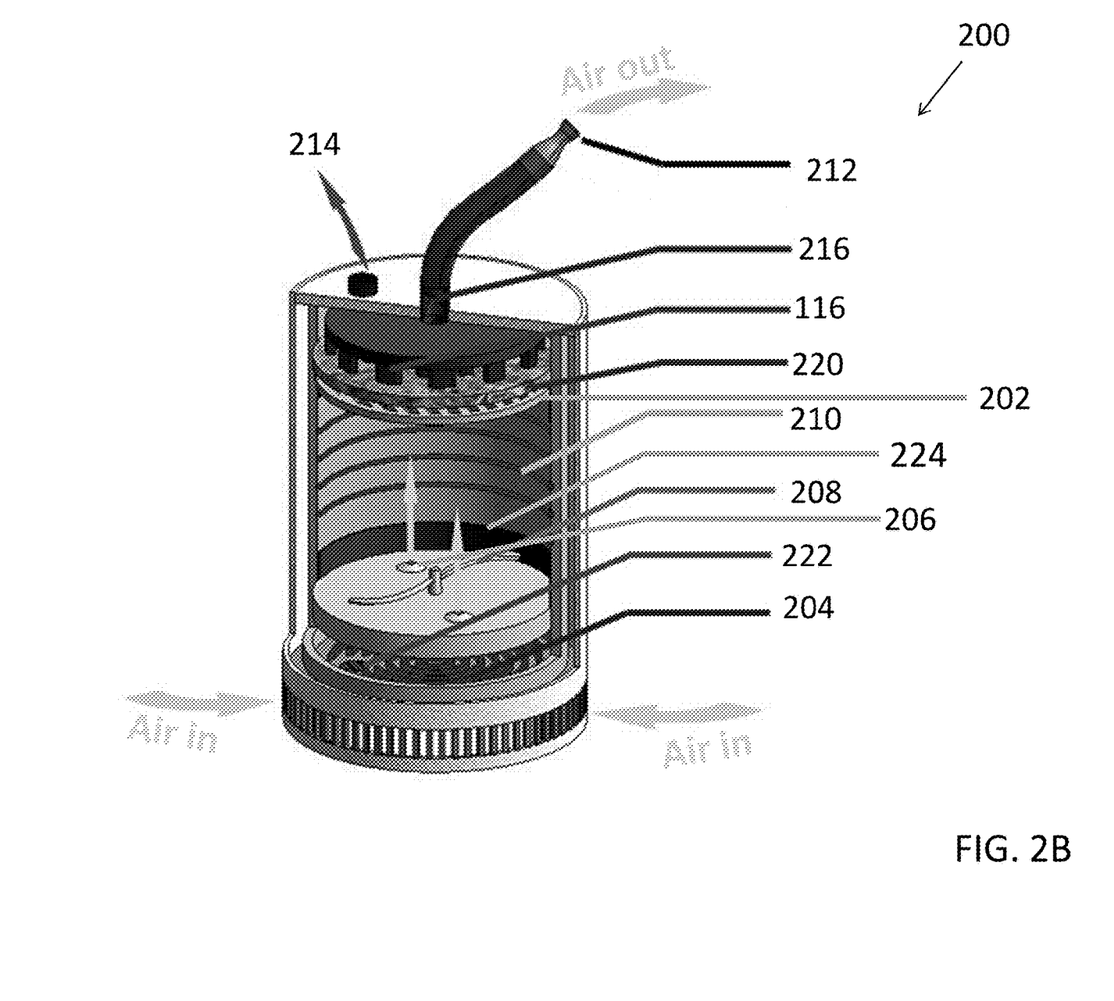
FIG. 2B is a perspective view of an apparatus for extracting a compound from a substance in accordance with another embodiment of the present invention.
Figure 3A:
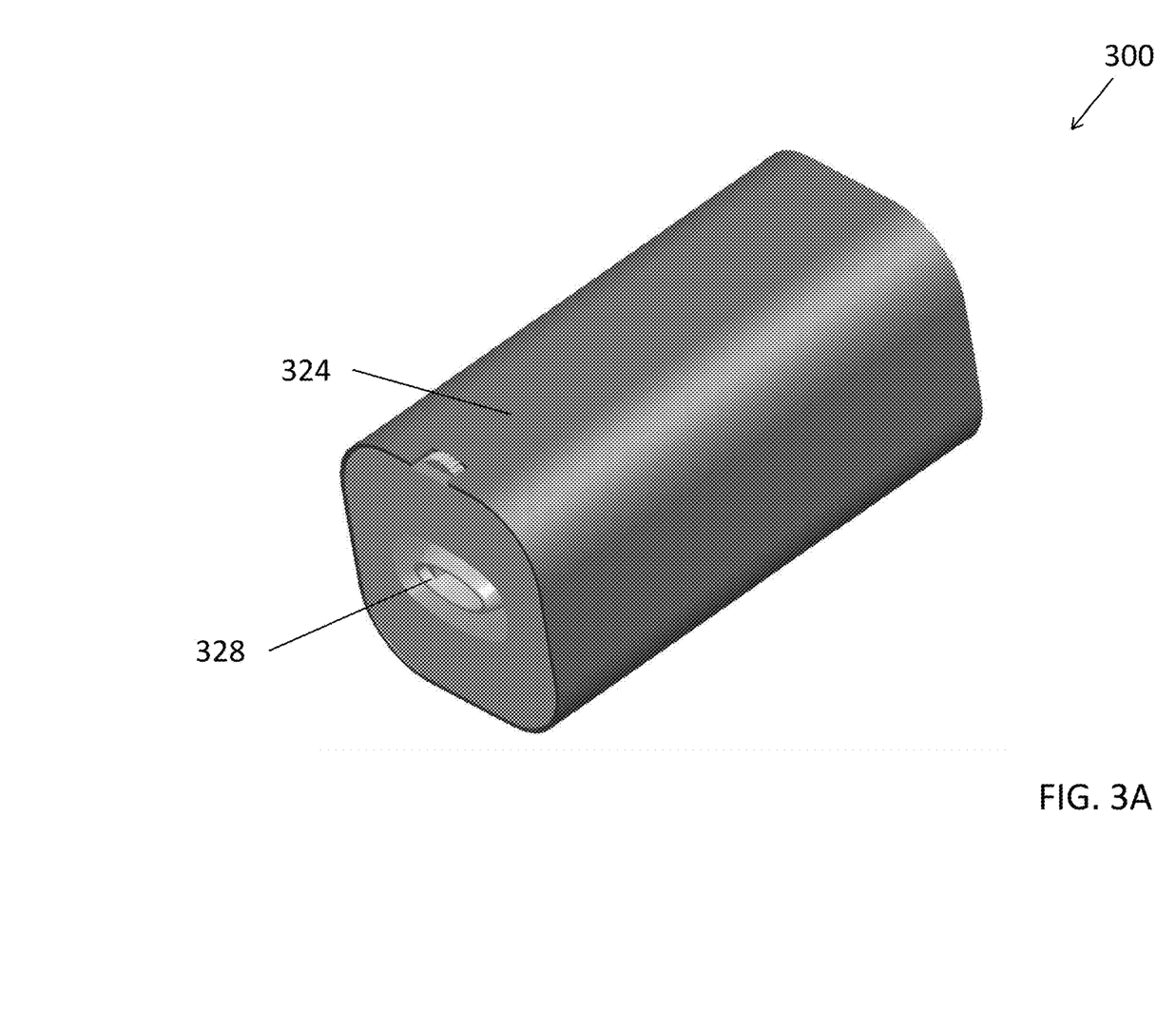
FIG. 3A is a perspective view of an apparatus for extracting a compound from a substance in accordance with another embodiment of the present invention.
Figure 3B:
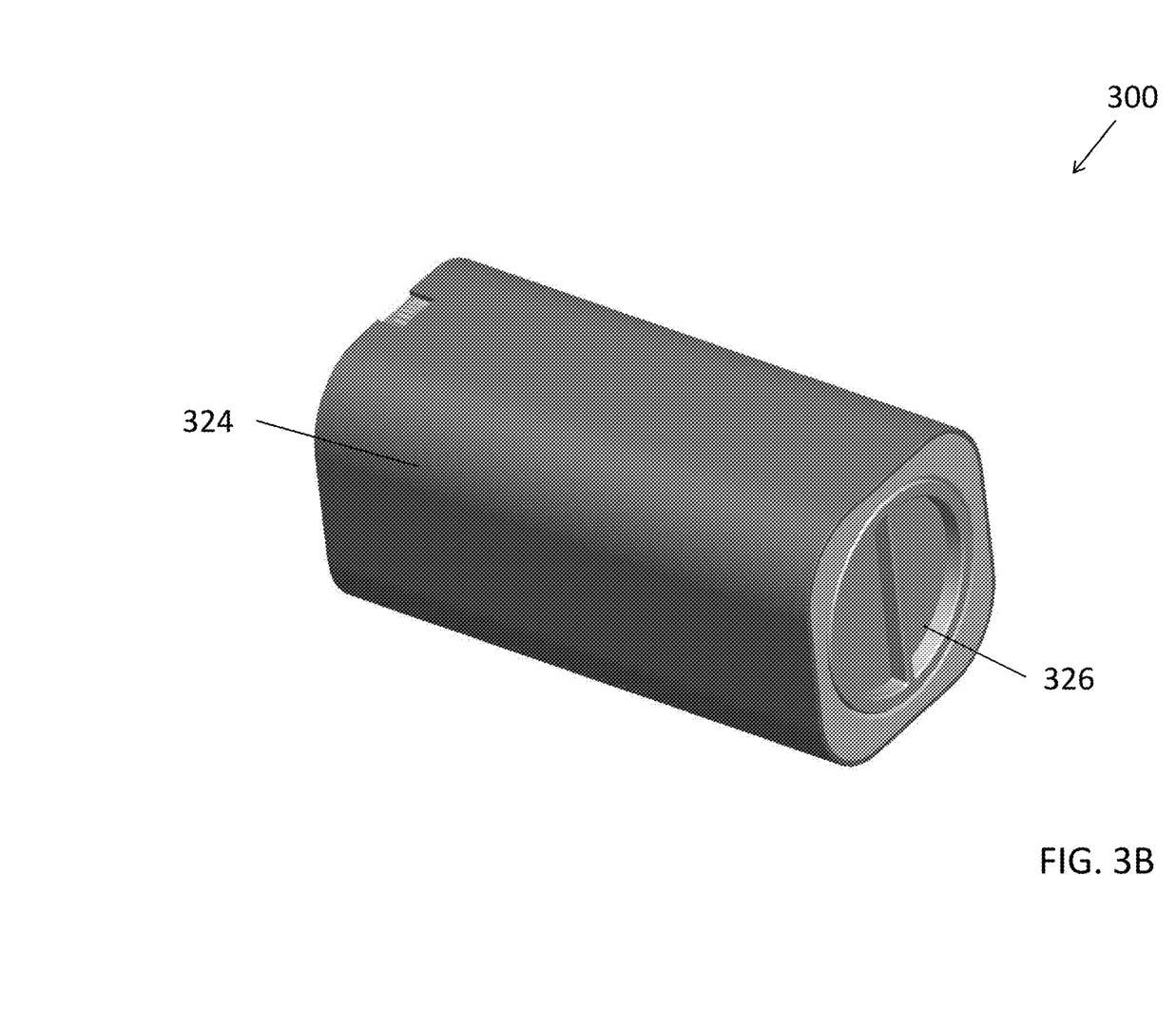
FIG. 3B is another perspective view of the apparatus for extracting a compound from a substance of FIG. 3A.
Figure 3C:
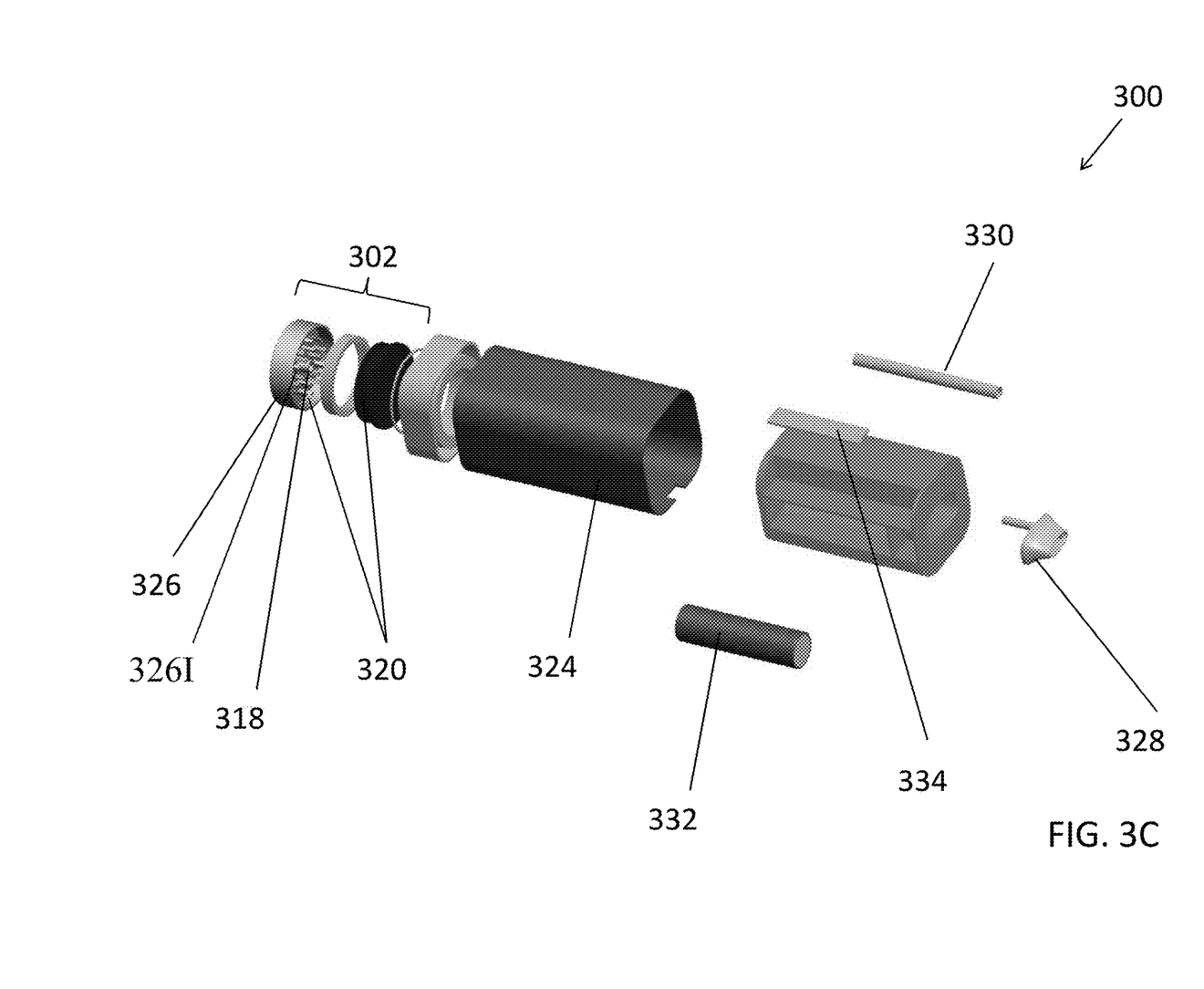
FIG. 3C is an exploded view of the apparatus for extracting a compound from a substance of FIG. 3A.
Figure 3D:
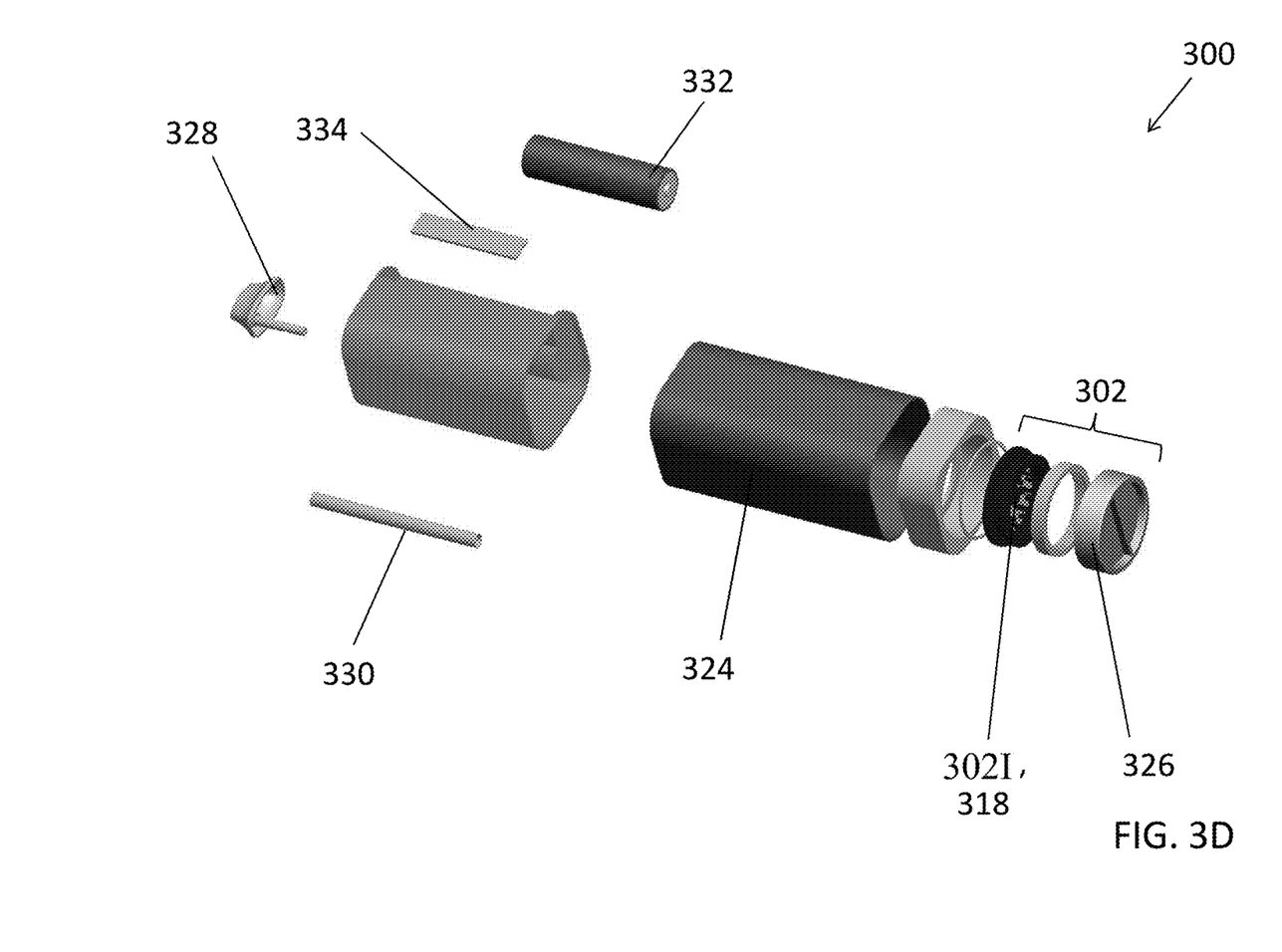
FIG. 3D is another exploded view of the apparatus for extracting a compound from a substance of FIG. 3A.

With reference to FIGS. 1, 2A and 2B, there is provided an apparatus 100 for extracting a compound from a substance comprising: an extraction chamber 102 arranged to extract a compound from a substance stored within the extraction chamber 102, wherein the extraction chamber 102 is arranged to agitate the substance; and when upon the substance is under an applied heat, the extraction chamber 102 is arranged to extract the compound into an air flow 112 passing through the extraction chamber 102.

In this embodiment, the apparatus 100 is a portable device for extracting a fragrance from a substance stored in the extraction chamber 102, such as a cylindrical chamber defining a cavity for storing the substance. The fragrance may be contained in a compound, a particle, or may be in any physical form such that the fragrance may be extracted out from the extraction chamber 102 during an extraction process. For example when an air flow 112 passes through the extraction chamber 102, the air flow 112 may "carry" the fragrance or the fragrance containing compound to the air outlet 108 of the portable device.

As shown in FIGS. 1, 2A and 2B, the apparatus 100 comprises an extraction chamber 102. The extraction chamber 102 may be arranged to store the substance containing the compound to be extracted. This can include, for example, tobacco, hemp, an entire or parts of a cigar, and/or a cigarette or other substance including flavoured substrate such as paper, wood or other organic or inorganic compounds. Under suitable heating, fragrances in these substances are extracted to the surrounding environment within the chamber 102.

The source of applied heat may vary according to different configuration of the apparatus 100. In one example embodiment, the extraction chamber 102 is a source of applied heat, such that the substance stored within the extraction chamber 102 is heated by the chamber so as to facilitate the extraction of compound in the substance. For example, tobacco or tobacco fragments may be baked at certain temperature (e.g. 200° C. to 350° C.) within the extraction chamber 102. In addition, the extraction chamber 102 may also apply heat to the air flow 112 passing through the extraction chamber 102 simultaneously. Preferably, the extraction chamber 102 may comprise a heating element 104 such as a heating wire or filament powered by a battery or an electrical power source. Optionally, a thermal controller may also be included to precisely control the temperature of the applied heat.

In an alternative embodiment, the air flow 112 passing through the extraction chamber 102 is the source of applied heat. The air flow 112 may be preheated before entering the extraction chamber 102, preferably at 300° C. to 500° C., to apply heat to the substance stored within the extraction chamber 102 in a heat exchange process such that the tobacco or tobacco fragments may be baked at a predetermined temperature within the extraction chamber 102. Preferably, a heating element (such as a heating coil or a heating filament) may be deposited at the entrance 106 of the extraction chamber 102, such as an air inlet 110 connected to the extraction chamber 102.

Preferably, as shown in FIGS. 2A and 2B, the sources of applied heat are from both the preheated air flow 112 and the extraction chamber 102 in accordance with some other alternative heating strategies or configurations. For example, the air flow 112 may be preheated at 300° C. to 500° C. and the substance may be heated at 180° C. to 200° C. within the extraction chamber 102.

As shown in FIG. 1 and FIG. 2A, the extraction chamber 102 is arranged to fluidly communicate with an air inlet 110 and an air outlet 108. The air inlet 110, the extraction chamber 102 and the air outlet 108 together form an air passage which allows air to flow through. For example, an air flow 112 may be supplied through the air inlet 110 to the extraction chamber 102, and then the air flow 112 may be exhausted through the air outlet 108. The air flow 112 may then facilitate the extraction of the fragrance or the extracted compound in the extraction chamber 102 by carrying the extracted compound to exit the apparatus 100 via the air outlet 108, and the extracted compound may be subsequently sensed, smelt or inhaled.

The apparatus 100 may further comprise one or more valves 114 deposited within the air passage. For example, a valve 114 may be deposited adjacent to the air inlet 110 and/or the air outlet 108, such that the amount of air flow 112 passing through the air passage may be controlled by the valve 114. By controlling the amount of air entering and exiting the extraction chamber 102, the extraction amount of the compound may also be controlled.

In this embodiment, the extraction chamber 102 is further arranged to agitate the substance stored within the extraction chamber 102. For example, agitating the substance may include disturbing the substance stored within the chamber, compressing or the grinding or shredding of the substance to form fragments of substance, which may effectively increases the surface area of the substance stored within the chamber. In turn, this allows the compound to be more easily extracted by the air flow 112 passing through. Grinding or shredding the substance to form fragments may also be favourable to compressing the substance stored, such that more substance may be stored within the available cavity provided by the extraction chamber 102. Advantageously, by agitating the substance stored, fragments of the substance may be distributed/redistributed within the extraction chamber such that fragments containing different concentrations of the compound may be evenly distributed across the entire extraction chamber.

Preferably, the extraction chamber 102 further comprises a grinder 116 arranged to grind the substance stored within the extraction chamber 102. As shown in FIG. 1, the grinder 116 may comprise grinding teeth 118 formed at the upper surface of the extraction chamber 102. When the grinder 116 is rotated with respect to the central axis of the extraction chamber 102, substance such as tobacco or a whole cigarette as sold in common packet form (with or without the filter portion removed) may be grinded or shredded to form smaller fragments. Optionally, the grinder 116 may cooperate with the screw thread structures 120 formed on both the surface of the grinder 116 and the internal surface of the extraction chamber 102. During rotating and grinding, the screw thread structure 120 may force the grinder 116 (or the grinding surface) to move laterally along the central axis of the extraction chamber so as to compress the fragments of the substance formed.

Such grinding feature is advantageous in that tobacco available in any package may be processed by the apparatus 100 for consumption. For example, a user may process shredded tobacco obtained from tobacco suppliers by placing the shredded tobacco into the extraction chamber 102. The user may then operate the extraction chamber 102 to further grind or shred the shredded tobacco to form smaller fragments of tobacco. Subsequently, the fragrant compound contained in the tobacco may be consumed by the user by passing through an air flow to the extraction chamber 102 under applied heat to the substance stored within the extraction chamber 102.

Alternatively, a user may process tobacco wrapped in a whole cigarette as sold in common packet form. In this example, the user may either unwrap the cigarette to extract the shredded tobacco and then process the shredded tobacco as abovementioned, or the user may process the tobacco by simply placing the whole cigarette into the extraction chamber 102, using the grinder 116 of the extraction chamber 102 to grind or to shred the whole cigarette into fragments including fragments of tobacco and the wrapping paper. Subsequently, the fragrant compound contained in the tobacco may be consumed by the user by passing through an air flow to the extraction chamber 102 under applied heat to the substance stored within the extraction chamber 102. Depending on the different designs of the grinder 116 and the extraction chamber 102, in some embodiments, the user may manually remove the filter of the cigarette before placing the cigarette into the extraction chamber 102 such that the extraction chamber is not occupied by the filter of the cigarette.

Alternatively, as shown in FIG. 2A, the grinder 116 of the extraction chamber 102 may comprise a grinding surface 122 at an internal cavity of the extraction chamber 102. In this example, the grinder 116 comprises a grinding surface 122 at one end of the extraction chamber 102 and is fixed relative to the housing 124 of the apparatus 100. The extraction chamber 102 is arranged to rotate with respect to a central axis, such that the substance stored within the extraction chamber 102 may be agitated and/or grinded (by the grinding surface 122 formed at one end of the extraction cavity). Optionally, the extraction chamber 102 may comprise two or more grinding surfaces 122 to facilitate grinding or shredding the substance stored within the extraction chamber 102. In addition, compression means or structure may also be included to compress the fragments of substance formed after grinding.

With reference to FIG. 2B, there is shown another embodiment of the apparatus 200 for extracting a compound from a substance. In this embodiment, the apparatus 200 is similar to the embodiments of the apparatus 100 as shown in FIGS. 1 and 2A in that the apparatus 200 of FIG. 2B is arranged to agitate a substance such that a compound can be extracted from the substance for consumption to a user. As shown, the chamber 224 is in communication with a grinder 116 such that a substance 220, such as, but not limited to, tobacco or a whole cigarette can be placed within the grinder 116 to be grinded into fragments. The fragments, once grinded, is then arranged to drop through a slot member 202 arranged to allow each of the fragments to enter the chamber 224.

In turn, the chamber 224 is also arranged to receive an airflow which has been preheated by a heating element 204 after air is drawn in from the outside of the chamber 224. In this example, the inventors have discovered through trials and repeated experimentation that the temperature of the preheated air entering the chamber via entry valves 206 may be around 300 to 500 degrees Celsius although this will vary based on the substances which are being processed. In this example, the air is drawn in to the apparatus 200 through vents by pressure created by a fan, pump or even a user's suction at the mouth piece 212. The air is then passed through an air value 222 to the heating element for preheating to the desired temperature.

Once the heated air is within the chamber 224, an agitator in the form of a stirrer 208 is arranged to stir the fragments of substance stored within the chamber 224 so as to mix with the heated air within the chamber 224. This allows the chemical or fragrance compounds within the fragments to be released and distributed to the heated air within the chamber 224. Preferably, a secondary heating element 210 is also disposed within the chamber 224 to maintain an appropriate chamber temperature so as to extract the chemical or fragrance compounds from the fragments efficiently. The appropriate chamber temperature may also vary depending on the preferences of the user and the fragments stored within the chamber 224, although repeated trials and experimentation suggests that the temperature may be around 120 to 180 degrees Celsius.

After the chemical or fragrance compounds are distributed to the air within the chamber 224, the air may then be released to a mouth piece 212 via an air channel controlled by a valve 216. This mouth piece 212 may then be accessed to a user to inhale the chemical or fragrance compounds extracted from the substance.

Preferably, as shown in this embodiment, the chamber 224 includes a release valve 214 to relief build up pressure within the chamber 224 so as to improve the safety of the apparatus 200. Due to the heating of the air within the chamber 224 and the control of the air drawn in and released from the chamber 224, pressure may be built up within the chamber 224. Such a release valve 214 is advantageous in that extreme pressure building up within the chamber 224 can be released without damaging the apparatus 200 or potentially injuring the user.

In the example embodiment as shown in FIGS. 1, 2A and 2B, the apparatus 100 further comprises a supplementary component 126, in which a supplementary compound is arranged to be extracted from the supplementary component 126 when the air flow 112 passes through the supplementary component 126. For example, the supplementary component is a filter 126 filled with a supplementary compound such as a fragrance different from the one contained in the substance stored within the extraction chamber 102. When an air flow 112 passes through the filter 126, the supplementary compound is extracted from the filter 126. Hence, the smell of the air flow 112 may be mixed with the first fragrance extracted from the substance stored within the extraction chamber 102 and the second fragrance extracted from the filter 126 after flowing through the extraction chamber 102 and the filter 126. Preferably, the filter or the supplementary component 126 may be deposited adjacent to the air outlet 108.

In some example embodiments, the apparatus 100 or the extraction chamber 102 is arranged to operate according to a predetermined extraction profile associated with the substance stored in the extraction chamber 102. Such extraction profile may include a heating duration and/or a heating temperature. For example, the fragrances contained in cigarettes produced by different manufacturers may be best extracted in different extraction conditions, such as baking temperature in the extraction chamber 102, temperature of the air flow 112, baking duration in the extraction chamber 102, amount of air flow 112 or the air flow 112 rate, etc. Such configuration allows the apparatus 100 to be compatible to a large variety of fragrance containing substance, including tobacco, hemp, cigars or cigarettes produced by different manufacturers and/or different markets.

Optionally, the apparatus 100 or the extraction chamber 102 may comprise a processing and communication module arranged to communicate with an electronic communication device. For example, the electronic communication device, such as a computer or a smartphone, may control the operation of the extraction chamber 102, and to facilitate the extraction process such as controlling the extraction chamber 102 to operate according to the predetermined extraction profile. Different extraction profiles may be stored in the electronic communication device or retrieved by the electronic communication device from an external database, thus it is not necessary for the apparatus 100 to include a large memory for storing different extraction profiles.

The communication may facilitate uploading extraction profile and/or operation command for the extraction chamber 102. Preferably, the apparatus 100 or the extraction chamber 102 may communicate via a wireless communication link, such as Bluetooth, Wi-Fi, RF, or any other suitable communication link as appreciated by a person skilled in the art. Alternatively, the apparatus 100 or the extraction chamber 102 may communicate via a wired communication link.

In an exemplary embodiment, a user may operatively connect the apparatus 100 with a smartphone. A dedicated software application may be installed in the smartphone providing a user interface for the user to control the apparatus 100 or the extraction chamber 102. For example, the user may download a predetermined extraction profile optimized for extracting a fragrant compound contained in a cigarette of certain brand from a database. The smartphone may then operate the extraction chamber according to the downloaded extraction profile to heat the cigarette placed in the extraction chamber 102 at a predetermined temperature. The user may then consume the cigarette with the fragrant compound extracted in an optimized condition. If the user decides to consume another cigarette of another brand, the user may then select the suitable extraction profile from the database so as to operate the extraction chamber 102 to extract the fragrant compound from such newly inserted cigarette according to a different optimized extraction profile.

Preferably, the apparatus 100 or the extraction chamber 102 is arranged to be powered by an AC/DC power source. For example, a rechargeable battery, a non-rechargeable battery, a fuel cell, or an AC electricity supply.

In an example as shown in FIGS. 3A to 3D, there is shown another embodiment of an apparatus 300 for extracting a compound from a substance. In this embodiment, the apparatus 300 comprising a housing 324 arranged to house the internal components of the apparatus 300. These internal components include an extraction chamber 302 defined within an internal cavity, in which the extraction chamber 302 is arranged to stored, and agitate the substance stored within the extraction chamber 302. The internal housing also comprises a battery compartment for storing a battery cell 332 for providing electrical power source to the control circuit board 334 and the extraction chamber 302. The extraction chamber 302 is arranged to be operatively closed by a cover 326. Grinding teeth 318 is provided on the internal surface 326I of the cover 326 as well as on an internal surface 302I of the extraction chamber 302, such that when the cover 326 is rotated to close the extraction chamber 302, the substance placed within the extraction chamber 302 may be grinded simultaneously. The screw thread structure 320 on the cover and the extraction chamber 302 is arranged to operatively fix the cover 326 to the extraction chamber 302, in addition, to facilitate the compression of the grinded substance stored within the extraction chamber 302 by forcing a lateral movement of the cover 326 towards the extraction chamber 302.

A mouthpiece 328 may be provided in connection to a delivery tube 330 such that the mouthpiece 328 is fluidly connected to the outlet of the extraction chamber 302. During extraction process, the extraction chamber 302 and the substance stored within the chamber are heated to a predetermined temperature. A suction force generated from the mouthpiece 328 by a user forces an air flow to enter the extraction chamber 302 from the air inlet. The air flow is preheated to a predetermined preheating temperature. The substance experienced the applied heated from the preheated air flow and the extraction chamber 302, and the compound or the first fragrance is extracted from the substance by the air flow passing through. The air flow is exhausted form the extraction chamber 302 at the air outlet and then passes through a filter containing a second fragrance, such that the air flow is mixed with both the first fragrance and the second fragrance. Finally, the air flow mixed with the fragrances may be inhaled by the user.

Figure 4A:
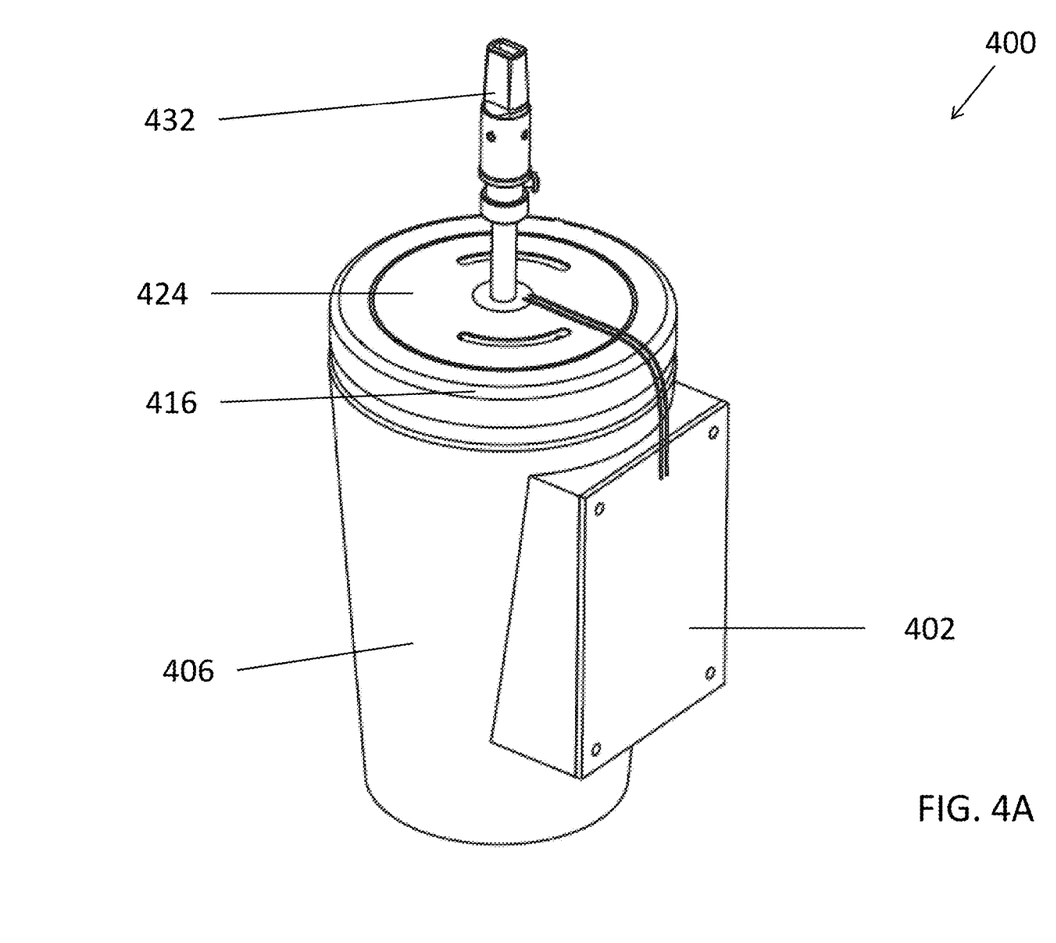
FIG. 4A is a perspective view of an apparatus for extracting a compound from a substance in accordance with another embodiment of the present invention.
Figure 4B:
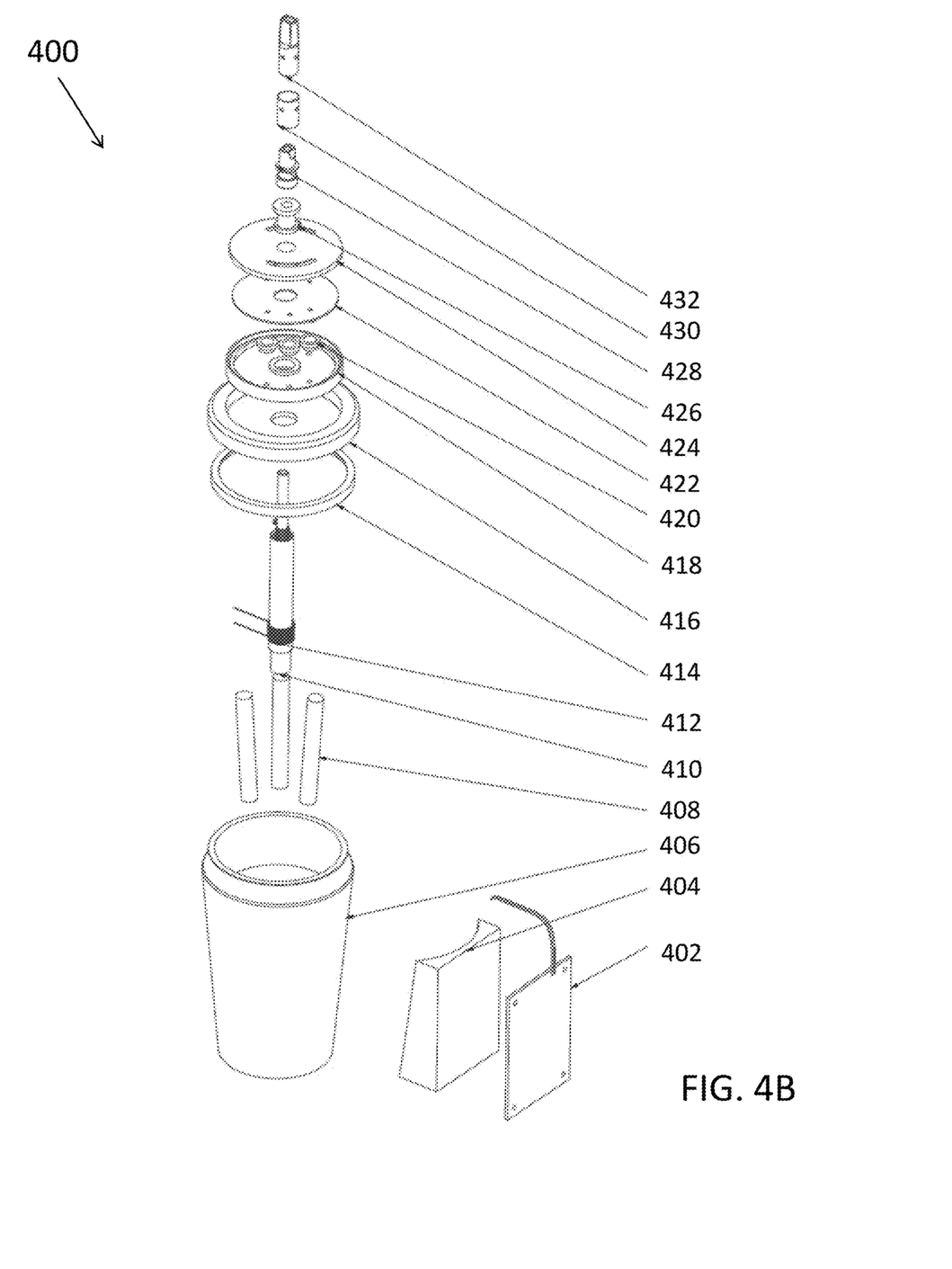
FIG. 4B is an exploded view of the apparatus for extracting a compound from a substance of FIG. 4A.

With reference to FIGS. 4A and 4B, there is shown an alternative embodiment of an apparatus 400 for extracting a compound from a substance. In this embodiment, the extraction chamber further comprises a heat retaining structure, such as a vacuum flask 406 arranged to at least partially retain the heat applied to the substance during the extraction process. For example, the heat retaining structure may be provided as a vacuum flask 406 which may prevent heat loss to the surrounding during the extraction process. Preferably, the extraction chamber is further arranged to maintain a temperature of the extracted compound and/or the substance within the extraction chamber at or above 120° C. Alternatively, a different temperature may be in accordance with different extraction profile.

To apply heat to bake or roast the substance within the extraction chamber, a heating element 412 may be provided in the chamber. In an example operation, the heating element 412 may be set at a temperature between 150° C. and 200° C. and the substance may be heated for a predetermined period such as 30 minutes or longer. In this extraction process, the compound in the substance (such as tobacco in cigarette 408) may be extracted to air within the extraction chamber, and may be readily consumed by a user. The heating element 412 may also be used to keep the air and the extracted compound warm by supplying heat which is of a lower warming temperature (such as 120° C.).

Preferably, the extraction chamber or the vacuum flask 406 may be provided with the at least one valve 420 which selectively allows the air flow to pass through. The valves may be closed to trap or retain the air flow which enters into the extraction chamber, such that the air flow and the substance stored are subjected to a continuous applied heat in the extraction chamber. This may be advantageous for an extraction of certain types of compound which requires a relatively longer time of roasting or baking of the substance containing the compound.

In one example embodiment, the at least one valve includes a one-way valve 420 arranged to seal the extraction chamber or the vacuum flask 406 during the extraction process. Preferably, each of the one-way valves is made of silicone, and the amount of fresh air may be controlled or adjusted during the consumption of the extracted compound.

With reference to FIG. 4B, the apparatus 400 may comprises the following components, including a PCB assembly 402 which includes necessary controller components and/or battery for powering different components of the apparatus 400, and the PCB assembly 402 may be mounted to the extraction chamber with a mounting chassis 404. The extraction chamber comprises a vacuum flask 406 defined with an opening and a cavity. The cavity is used for accommodating a heating element 412 with a heating chamber 410 for holding a cigarette 408 therein. The cavity may also be used for temporally storing additional cigarettes 408 for consumption. The opening is selectively closed and sealed by a top cover 416 with a seal ring 414. The top cover 416 is provided with components facilitating air flowing into and out of the extraction chamber, this may include a holder 418 and an inlay 422 which combine and hold a plurality of one-way silicone valves 420 on the holder 418, and a rotating disc 424 with openings such that the air passage may be selectively opened or closed by the rotating disc 424 and the amount of inlet air may be adjusted. The top cover 416 is also provided with a central opening which defines a portion of an air outlet of the extraction chamber. A mouthpiece adaptor 428 is connected to the central opening with a sealing gasket 426, and the mouthpiece adaptor 428 is arranged to receive a replaceable mouthpiece 432. In addition, an air flow adjustable ring 430 is provided at the mouthpiece adaptor 428 which allows controlling the amount of air flow out of the extraction chamber.

These embodiments are advantageous in that, the apparatus for extracting a compound from a substance provides an alternative way for consuming cigarettes or other tobacco products. A user may continently place any cigarettes available in the market into the extraction chamber, and then the tobacco contained within the extraction chamber may be readily consumed. This is advantageous as the user is not required to unwrap the cigarette to extract the shredded tobacco nor to further shred or grind the tobacco to smaller fragments so as to facilitate the extraction of the fragrant compound contained in the shredded tobacco during the extraction process of the fragrant compound.

Preferably, the extraction process is also based on baking the tobacco stored within the chamber rather than burning the tobacco. Baking is more controllable than burning, and the temperature for baking is much lower than burning whilst providing similar fragrance extraction efficiency when comparing both methods. In addition, the temperature of the air flow containing the fragrant compound is not so hot that would choke a user inhaling the air flow when consuming the tobacco using the apparatus in accordance with these embodiments.

Advantageously, the extraction of fragrance from the tobacco stored is readily started, paused and/or resumed by shutting off the air passage connecting the extraction chamber or terminating the air flow passing through the extraction chamber. A user may consume even a small amount of tobacco (or the fragrance contained in the tobacco) by turning on the apparatus for a short period. Hence the consumption of the tobacco is more flexible. In addition, a large variety of additional toning fragrance may be introduced to the original fragrance by passing through the generated air flow to a filter.

In addition, the apparatus for extracting a compound from a substance in accordance with these embodiments communicate with an electronic device, such that the extraction process may be optimized and the extraction profile may be updated by the manufacturer of the apparatus, or customized by the user according to different preferences.

Without deviating from the spirit of the invention, the method and apparatus for extracting a compound from a substance can be implemented to extract any compound in any substance, such as an aroma, a fragrance containing solid or liquid, or herbs. In some embodiments, the apparatus for extracting a compound from a substance can be implemented to extract fragrances or compound to the surrounding environment such as a room or a cavity.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. An apparatus for extracting a compound from a substance comprising:
   an extraction chamber arranged to store the substance therein; and
   a grinder within the extraction chamber arranged to grind the substance stored within the extraction chamber;
   when upon the substance is under an applied heat generated by a heat source, the extraction chamber is arranged to extract the compound into an air flow passing through the extraction chamber.

2. The apparatus for extracting a compound from a substance in accordance with claim 1, wherein the compound contains a first fragrance.

3. The apparatus for extracting a compound from a substance in accordance with claim 2, wherein the extraction chamber is further arranged to fluidly communicate with an air inlet and an air outlet connected to the extraction chamber.

4. The apparatus for extracting a compound from a substance in accordance with claim 3, wherein an air passage is defined by the air inlet, the extraction chamber and the air outlet sequentially.

5. A The apparatus for extracting a compound from a substance in accordance with claim 4, further comprising at least one valve deposited within the air passage arranged to allow the air flow to pass through, wherein the at least one valve is arranged to control an amount of the air flow passing through the air passage.

6. A The apparatus for extracting a compound from a substance in accordance with claim 5, wherein the at least one valve is deposited adjacent to the air inlet and/or the air outlet.

7. The apparatus for extracting a compound from a substance in accordance with claim 5, wherein the at least one valve includes a one-way valve.

8. The apparatus for extracting a compound from a substance in accordance with claim 7, wherein the at least one valve is further arranged to retain the air flow within the extraction chamber when the substance is under applied heat.

9. A The apparatus for extracting a compound from a substance in accordance with claim 3, further comprising a preheating element deposited at the air inlet and arranged to preheat the air flow, wherein the air flow is arranged to be preheated before entering the extraction chamber.

10. A The apparatus for extracting a compound from a substance in accordance with claim 9, wherein the air flow is arranged to be preheated at a temperature substantially higher than that in the extraction chamber.

11. A The apparatus for extracting a compound from a substance in accordance with claim 3, wherein the air flow is further arranged to extract a supplementary compound from a supplementary component when the air flow passes through the supplementary component.

12. The apparatus for extracting a compound from a substance in accordance with claim 11, wherein the supplementary component is deposited adjacent to the air outlet.

13. The apparatus for extracting a compound from a substance in accordance with claim 11, wherein the supplementary component is a filter filled with the supplementary compound.

14. The apparatus for extracting a compound from a substance in accordance with claim 11, wherein the supplementary compound contains a second fragrance.

15. The apparatus for extracting a compound from a substance in accordance with claim 1, wherein the grinder is arranged to grind the substance to form fragments of the substance.

16. The apparatus for extracting a compound from a substance in accordance with claim 1, wherein the grinder is further arranged to compress the substance stored within the extraction chamber.

17. The apparatus for extracting a compound from a substance in accordance with claim 16, wherein the extraction chamber is operable to rotate so as to agitate, to compress and/or to grind the substance stored within the extraction chamber.

18. The apparatus for extracting a compound from a substance in accordance with claim 1, wherein the extraction chamber comprises a heating element operable as the heat source.

19. The apparatus for extracting a compound from a substance in accordance with claim 18, wherein the heating element is arranged to heat the substance stored within the extraction chamber and/or the air flow passing through the extraction chamber.

20. The apparatus for extracting a compound from a substance in accordance with claim 1, wherein the extraction chamber is arranged to operate according to a predetermined extraction profile associated with the substance stored in the extraction chamber.

21. The apparatus for extracting a compound from a substance in accordance with claim 20, wherein the predetermined extraction profile includes a predetermined heating duration and/or a predetermined heating temperature.

22. The apparatus for extracting a compound from a substance in accordance with claim 20, further comprising a communication module arranged to communicate with an electronic communication device; wherein the communication module is arranged to facilitate controlling the extraction chamber to operate according to the predetermined extraction profile.

23. The apparatus for extracting a compound from a substance in accordance with claim 22, wherein the electronic communication device is arranged to control the operation of the extraction chamber.

24. The apparatus for extracting a compound from a substance in accordance with claim 1, wherein the substance includes at least one of tobacco, hemp, a cigar, or a cigarette.

25. The apparatus for extracting a compound from a substance in accordance with claim 1, wherein the extraction chamber is further arranged to at least partially retain the applied heat within the extraction chamber.

26. The apparatus for extracting a compound from a substance in accordance with claim 25, wherein the extraction chamber further comprises a heat retaining structure.

27. The apparatus for extracting a compound from a substance in accordance with claim 26, wherein the heat retaining structure includes a vacuum flask.

* * * * *